(12) United States Patent
Yamada

(10) Patent No.: US 7,263,061 B2
(45) Date of Patent: Aug. 28, 2007

(54) PACKET ROUTING APPARATUS FOR ROUTING PACKETS VIA A PRE-ESTABLISHED CONNECTION IN A STORE AND FORWARD NETWORK

(75) Inventor: Norio Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1039 days.

(21) Appl. No.: 10/303,262

(22) Filed: Nov. 25, 2002

(65) Prior Publication Data

US 2003/0198243 A1    Oct. 23, 2003

(30) Foreign Application Priority Data

Apr. 19, 2002    (JP) ............................. 2002-117418

(51) Int. Cl.
*G06F 11/00* (2006.01)
(52) U.S. Cl. .......................................... 370/217; 714/3
(58) Field of Classification Search ........ 370/216–218, 370/241–2, 244, 428–9; 714/2, 3, 5–7
See application file for complete search history.

(56) References Cited

U.S. PATENT DOCUMENTS

| | | | |
|---|---|---|---|
| 4,133,027 A * | 1/1979 | Hogan | 700/82 |
| 6,327,243 B1 * | 12/2001 | Gregorat | 370/218 |
| 7,042,837 B1 * | 5/2006 | Cassiday et al. | 370/225 |
| 2005/0163044 A1 * | 7/2005 | Haq et al. | 370/219 |

FOREIGN PATENT DOCUMENTS

| | | |
|---|---|---|
| JP | 05-020237 | 1/1993 |
| JP | 06-252939 | 9/1994 |
| JP | 9-321789 | 12/1997 |
| JP | 63-049871 | 2/1998 |
| JP | 2000-349783 | 12/2000 |

* cited by examiner

*Primary Examiner*—Doris H. To
*Assistant Examiner*—Kerri M Rose
(74) *Attorney, Agent, or Firm*—Katten Muchin Rosenman LLP

(57) ABSTRACT

The present invention relates to a packet routing apparatus for routing packets via a pre-established connection in a store and forward network. It is an object of the present invention to realize adaptability to a desired redundant configuration and to avoid degradation in transmission efficiency during a reconfiguration period at low cost and with reliability. In order to achieve the object, the present invention is composed of a routing section for storing inputted packets and routing the packets according to route selection information conforming to the pre-established connection, and a plurality of control sections being arranged redundantly, for controlling the routing section according to a system configuration which conforms to a standby redundancy method, and allowing the operation of the routing section in a reconfiguration process while delivering information necessary for continuing the control to a part which inherits the control.

12 Claims, 7 Drawing Sheets

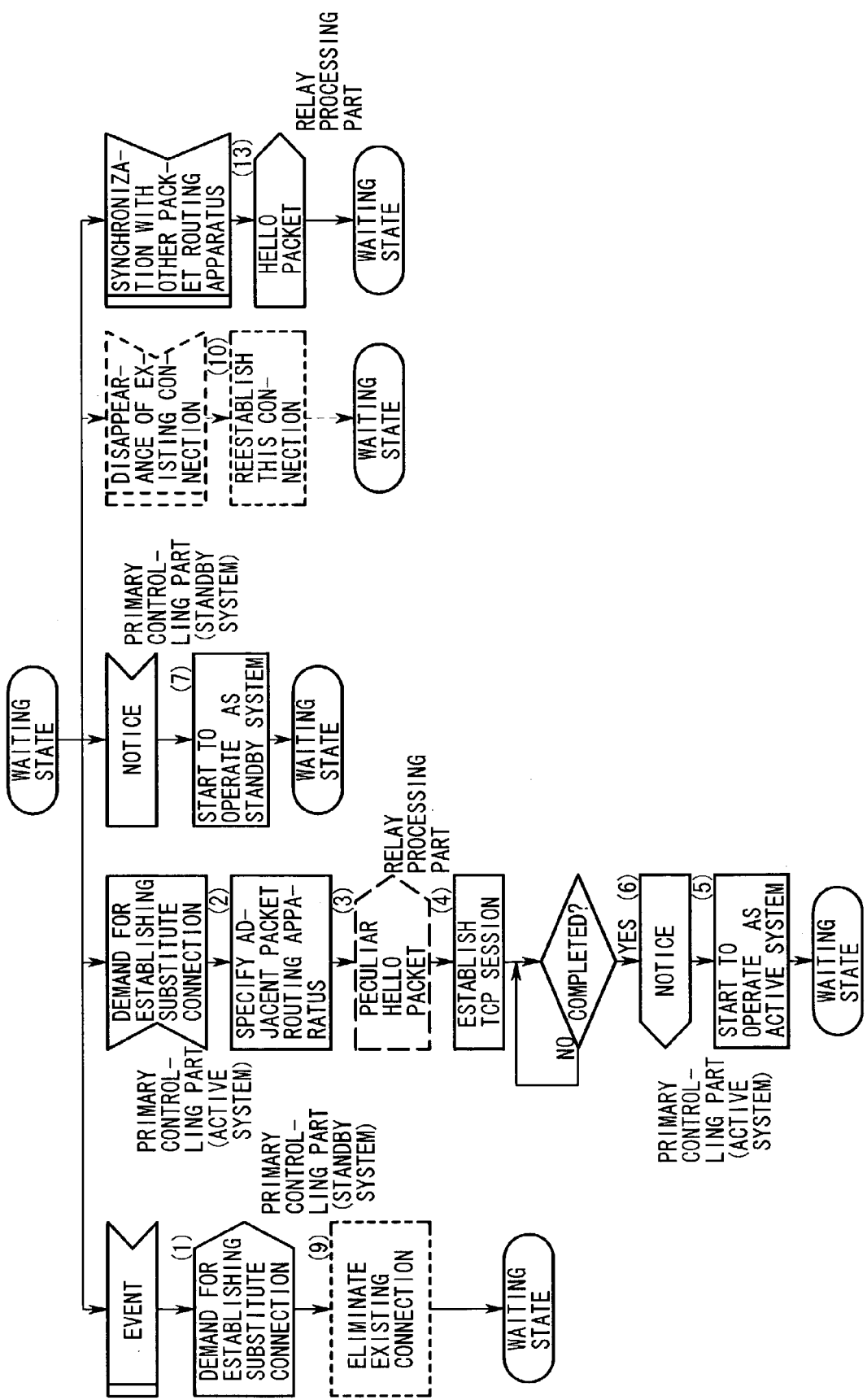
F I G. 2

F I G. 4
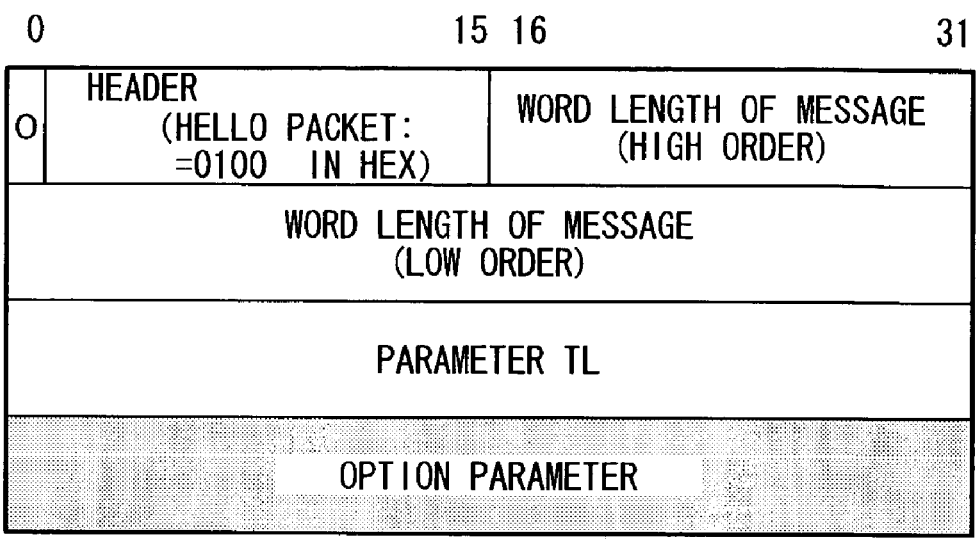

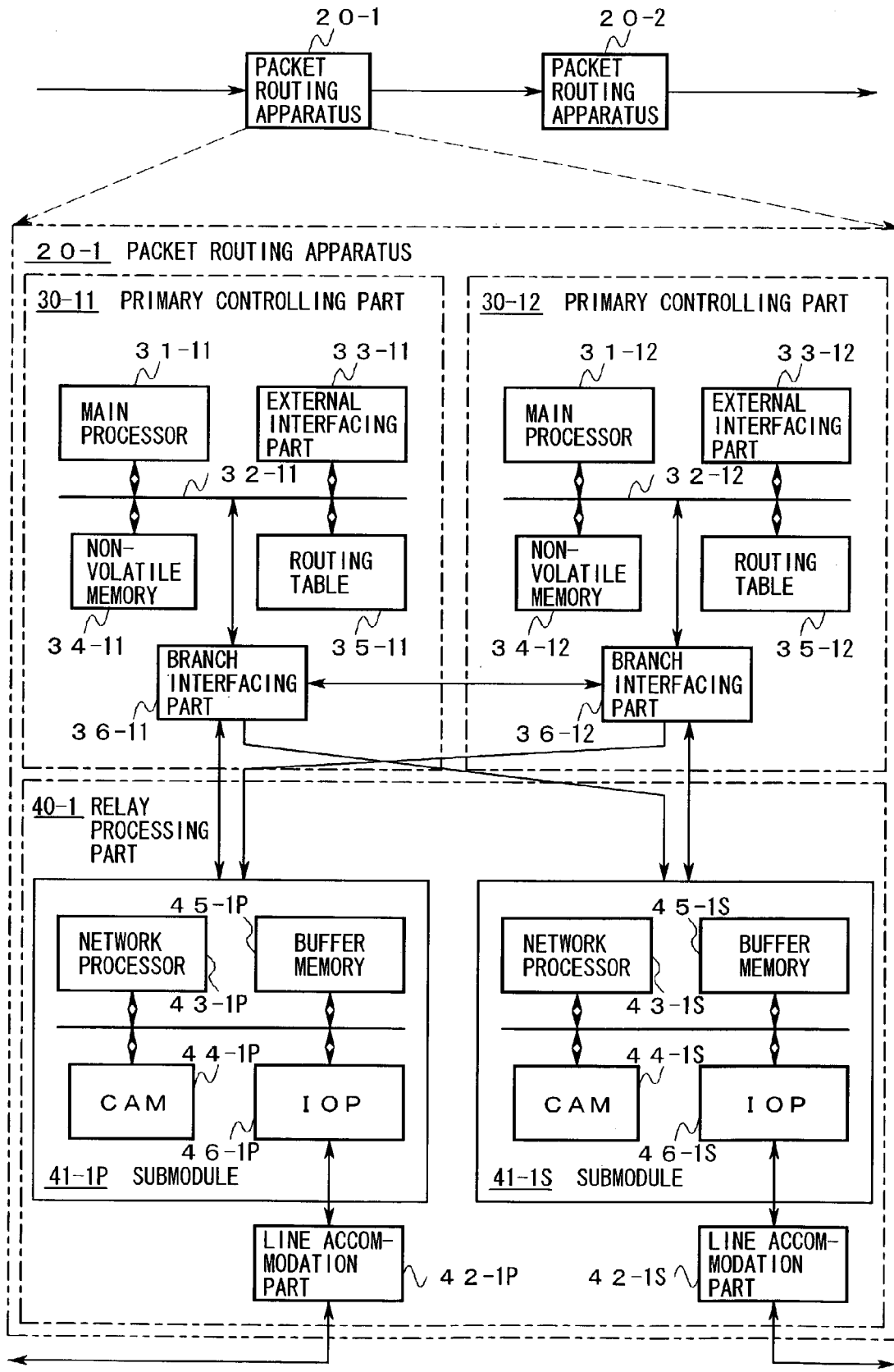
PRIOR ART FIG. 5

PRIOR ART       FIG. 6

| LABEL | TUNNEL IDENTIFIER |
|---|---|
| ⋮ | ⋮ |
| 32817 | 11.11.11.0/24 |
| 32816 | 77.77.77.0/24 |
| ⋮ | ⋮ |

PACKET ROUTING APPARATUS FOR ROUTING PACKETS VIA A PRE-ESTABLISHED CONNECTION IN A STORE AND FORWARD NETWORK

BACKGROUND OF THE INVENTION

1. Field of the Invention

The present invention relates to a packet routing apparatus for routing packets via a pre-established connection in a node in a store and forward network.

2. Description of the Related Art

In recent years, a packet transmission technique has been applied to wide area networks such as the Internet, mobile communication networks, and others, which enables provisions of various data communication services through these wide area networks. As a result, the number of terminals receiving such data communication services has been rapidly increasing.

In the above-mentioned wide area networks, MPLS (Multiprotocol Label Switching) is being actively employed, the MPLS capable of not only setting and selecting a path but also high-speed traffic monitoring and controlling based on, for example, 'a label used for identification', which is added to an IP packet.

Further, MPLS is a major technique for realizing traffic engineering, VPN (Virtual Private Network), and so on, therefore, it has been actively standardized and improved.

FIG. 5 is a view showing a configuration example of a packet routing apparatus disposed in an MPLS network.

In FIG. 5, packet routing apparatuses 20-1, 20-2 are disposed as nodes in the MPLS network in which, for example, a connection oriented label path is formed when necessary.

The packet routing apparatus 20-1 is composed of the following elements:

duplex primary controlling parts 30-11, 30-12; and a relay processing part 40-1 operating under the control of these primary controlling parts 30-11, 30-12 and connected to a preceding transmission section and a subsequent transmission section in the MPLS network.

The primary controlling part 30-11 is composed of the following elements:

a main processor 31-11;

an external interfacing part 33-11, a nonvolatile memory 34-11, and a routing table 35-11 which are connected to an internal bus 32-11 together with the main processor 31-11; and a branch interfacing part 36-11 connected to the aforesaid internal bus 32-11 and connected to a corresponding I/O terminal of the relay processing part 40-1 while being directly connected to a branch interfacing part 36-12 provided in the primary controlling part 30-12.

Incidentally, since the configuration of the primary controlling part 30-12 is the same as the configuration of the primary controlling part 30-11, a common reference numeral with '2' added thereto as a second suffix number is hereinafter assigned to each of corresponding components, and the explanation thereof will be omitted here.

The relay processing part 40-1 is composed of the following elements:

a submodule 41-1P connected to corresponding I/O terminals of the aforesaid branch interfacing parts 36-11, 36-12;

a submodule 41-1S connected to the other I/O terminals of the branch interfacing parts 36-11, 36-12;

a line accommodation part 42-1P operating under the control of the submodule 41-1P and connected to the aforesaid preceding transmission section; and a line accommodation part 42-1S operating under the control of the submodule 41-1S and connected to the aforesaid subsequent transmission section.

The submodule 41-1P is composed of the following elements:

a network processor 43-1P; and a CAM 44-1P, a buffer memory 45-1P, and an I/O processor (IOP) 46-1P which are accessed by the network processor 43-1P.

Incidentally, since the configuration of the submodule 41-1S is the same as the configuration of the submodule 41-1P, a common reference numeral with 'S' added thereto as a second suffix symbol is hereinafter assigned to each of corresponding components, and the explanation thereof will be omitted here.

In the conventional example as configured above, either one of the primary controlling parts 30-11, 30-12 (assumed to be denoted by the reference numeral '30-11' here for simplicity) operates as an active system according to a system configuration externally designated and the other one stands by as a standby system to operate based on standby redundancy.

In the primary controlling part 30-11 operating as the active system, the main processor 31-11 obtains route selection information (a part or all thereof may be given as a default value such as an initial value or others) based on a predetermined routing protocol, stores the route selection information in the routing table 35-11 in a form, for example, shown in FIG. 6, and updates the route selection information based on this routing protocol or other protocols when necessary (FIG. 7 (1)).

Further, every time the contents of the routing table 35-11 are thus set or updated, the main processor 31-11 transfers updated information among these contents to both of the submodules 41-1P, 41-1S or either one of them via the branch interfacing part 36-11 (FIG. 7 (2)).

The parts in the submodule 41-1P (41-1S) cooperate with one another in the following manner.

The network processor 43-1P (43-1S) stores the route selection information thus notified by the main processor 31-11 in the CAM 44-1P (44-1S) (FIG. 7 (3)).

The line accommodation part 42-1P (42-1S) physically interfaces with the preceding transmission section and physically receives each packet given thereto via the preceding transmission section (FIG. 7 (4)).

The I/O processor 46-1P (46-1S) plays a leading role in storage management involved in a write operation onto a first storage area of the buffer memory 45-1P (45-1S), and stores thus received packets in the first storage area in sequence under the storage management (FIG. 7 (5)).

Further, the network processor 43-1P (43-1S) plays a leading role in storage management involved in a read operation from the first storage area of the buffer memory 45-1P (45-1S), and reads the packets precedingly stored in this first storage area under the storage management based on first in first out to route each of the packets based on the following procedure.

It is judged whether or not a packet in question can be routed based on the route selection information stored in the CAM 44-1P (45-1S) (hereinafter, referred to as 'routable/nonroutable judgment') (FIG. 7 (6)).

This packet is delivered to the submodule 41-1S (41-1P) when the result of this routable/nonroutable judgment is true.

When, on the other hand, the result of the above routable/nonroutable judgment is false, the packet in question is temporarily held (hereinafter, referred to as a 'primary preserved packet') and this primary preserved packet is delivered to the main processor 31-11 via the branch interfacing part 36-11 and the internal bus 32-11 (FIG. 7 (7)).

The main processor 31-11 obtains route selection information to be applied to the routing of this primary preserved packet (hereinafter, referred to as 'additional route selection information') out of the route selection information stored in the routing table 35-11 (FIG. 7 (8)), and delivers this additional route selection information to the submodule 41-1P (41-1S) via the internal bus 32-11 and the branch interfacing part 36-11 (FIG. 7 (9)).

In the submodule 41-1P (41-1S), the network processor 43-1P (43-1S) processes the following.
- to store the delivered additional route selection information in a vacant area of the CAM 44-1P (44-1S) (FIG. 7 (10))
- to deliver the aforesaid primary preserved packet to the submodule 41-1S (41-1P), considering the result of the aforesaid 'routable/nonroutable judgment' to be true (or after performing the 'routable/nonroutable judgment' again and identifying the result thereof as true) (FIG. 7 (11))

Meanwhile, in the submodule 41-1S (41-1P), the network processor 43-1S (43-1P) plays a leading role in storage management involved in a write operation onto a second storage area of the buffer memory 45-1S (45-1P), and stores the packet delivered from the opposite submodule 41-1P (41-1S) in the aforesaid manner, in this second storage area in sequence under the storage management.

The I/O processor 46-1S (46-1P) processes the following.
- to play a leading role in storage management involved in a read operation from the aforesaid second storage area, and sequentially read each packet stored in this second storage area based on first in first out under the storage management
- to judge whether or not the packet in question can be routed based on the route selection information stored in the CAM 44-1S (44-1P) (hereinafter, referred to as 'routable/nonroutable judgment') (FIG. 7 (12))
- to transmit this packet to the subsequent transmission section via the line accommodation part 42-1S (42-1P) when the result of this routable/nonroutable judgment is true (FIG. 7 (13))
- when, on the other hand, the result of the above routable/nonroutable judgment is false, to temporarily maintain the packet in question (hereinafter, referred to as a 'secondary preserved packet') and to deliver this packet to the main processor 31-11 via the branch interfacing part 36-11 and the internal bus 32-11 (FIG. 7 (14))

Incidentally, since the processing, which is performed by the main processor 31-11 according to thus delivered packet, of giving the additional route selection information is the same as the aforesaid processing (FIG. 7 (8), (9)) except that neither a supply source of this packet nor a destination of the additional route selection information is the network processor 43-1P (43-1S) but both of them are the I/O processor 46-1S (46-1P), the explanation thereof will be omitted here.

The parts in the submodule 41-1S (41-1P) cooperate with one another in the following manner.
- The I/O processor 46-1S (46-1P) plays a leading role in the storage management involved in the read operation from the second storage area of the buffer memory 45-1S (45-1P) and reads, under the storage management, the secondary preserved packet delivered in the above-described manner (FIG. 7 (15)).
- The line accommodation part 42-1S (42-1P) physically interfaces with the subsequent transmission section and transmits this secondary preserved packet to this subsequent transmission section (FIG. 7 (16)).

Further, when some event occurs and the primary controlling part 30-11 as the active system is not allowed to operate (FIG. 7 (20)), the parts in the primary controlling part 30-12 which have been on standby as the standby system cooperate with one another in the following manner prior to the start of the aforesaid 'operation as the active system' according to the system configuration.

The main processor 31-12 provided in the primary controlling part 30-12 cooperates with an adjacent packet routing apparatus 20-2 based on a prescribed communication protocol via the relay processing part 20-1 and the subsequent transmission section to establish a new connection with this packet routing apparatus 20-2 (FIG. 7 (21)).

The main processor 31-12 obtains (generates) the route selection information consistent with this connection (FIG. 7 (22)) to store the route selection information in the routing table 35-12 and to deliver the route selection information to the submodule 41-1P (41-1S) via the branch interfacing part 36-12 (FIG. 7 (23)).

In the submodule 41-1P (41-1S), the network processor 43-1P (43-1S) stores the delivered route selection information in the CAM 44-1P (44-1S) (FIG. 7 (24)).

Further, the main processor 31-12 cooperates with the line accommodation part 42-1P (42-1S) via the branch interfacing part 36-12 and the submodule 41-1P (41-1S) to control the operation of each of the parts in the primary controlling part 30-12 which is to operate as the active system in place of the primary controlling part 30-11 (FIG. 7 (25)).

Therefore, the duplex primary controlling parts (30-11, 30-12) (30-21, 30-22) provided in the packet routing apparatuses 20-1, 20-2 operate based on the standby redundancy to form and maintain a desired label path between these packet routing apparatuses 20-1, 20-2 with high reliability.

In the above-described conventional example, when some event occurs, requiring the updating of the system configuration, it takes a long time as several ten seconds to establish such connection, which enables the 'primary controlling part which has been the standby system' to start operation as the active system, because a formation of a new connection needs to be done in a complex way as described above.

Accordingly, even when the primary controlling parts 30-11, 30-12 are redundantly arranged, useless increase in transmission delay and degradation in service quality are caused in the process of updating the system configuration.

Moreover, in order to update the system configuration based on active redundancy on a TCP layer, it is generally necessary to constantly deliver between the active system and the standby system and refer to, as common information, not only the states of the system in which the updating is performed based on the TCP protocol but also various information associated with the states.

Frequent information exchange between these active system and standby system, however, excessively increases an average throughput required for controlling the communication protocol, thereby causing an unnecessarily dense connection between these systems (connection involving hardware and/or software), which highly possibly results in reliability degradation and great increase in running cost.

Further, the total reliability and transmission quality of the system greatly depend on the performance and throughput of a module realizing the TCP so that remaining bugs are not allowable, and a complex configuration and a scale increase have to be avoided as much as possible.

Incidentally, each duplex primary controlling parts' sharing all the resources can avoid or substantially reduce the aforesaid complex way of formation of the new connection, increase in the transmission delay, and degradation in the service quality.

The aforesaid processing performed by the primary controlling parts 30-11, 30-12, however, is realized as application systems operating under separate operating systems which are not provided with any supporting function of sharing the resource therebetween.

Further, in order to satisfy strict demands concerning both reduction in man-hour required for development and securing of reliability, for example, an existing module such as API (Application Program Interface) or the like such as 'socket interface' which easily realizes interprocess communication as well as an access to a file is actively incorporated into such application systems.

Consequently, the application of an operating system enabling the aforesaid delivery and sharing of the resources is technically possible but difficult in actual practice due to restriction on cost.

SUMMARY OF THE INVENTION

It is an object of the present invention to provide a packet routing apparatus which can adapts to a desired redundant configuration without any basic change in hardware configuration and in which degradation in transmission efficiency during a reconfiguration period is avoided at low cost and with high reliability.

It is another object of the present invention to avoid an increase in transmission delay and degradation in service quality, which have occurred in the reconfiguration process of the prior art, without any change in basic hardware configuration.

It is still another object of the present invention to achieve a smooth reconfiguration and avoid an increase in transmission delay and degradation in transmission quality in the reconfiguration process, regardless of which type of a protocol a connection oriented path is formed by, as long as a new proper connection is established at the time of the reconfiguration.

It is yet another object of the present invention to realize a smooth reconfiguration and substantially reduce a transmission delay and degradation in transmission quality in the reconfiguration process regardless of which type of a protocol a connection oriented path is formed by, as long as a connection established in a preceding system configuration is continuously secured after the reconfiguration.

Yet another object of the present invention is that a control section and a routing section can adapt to various hardware configurations and the configuration of software realizing their processing can be simplified.

It is yet another object of the present invention to realize various forms of functional distribution and load distribution compared with the case in which route selection information is generated only by a control section operating as an active system.

It is yet another object of the present invention to surely reduce an increase in transmission delay and avoid degradation in service quality at the time of the reconfiguration, even when the degree of congestion is substantially different between a routing section and a control section and these sections operate asynchronously with each other.

It is yet another object of the present invention to reconfigure the system quickly and efficiently.

It is yet another object of the present invention to easily and quickly reconfigure the system without increase in cost.

It is yet another object of the present invention to route packets via a desired connection accurately and stably compared with the case where factors which determine the system configuration and the factor of initiating the reconfiguration include factors other than actual states of associated resources.

It is yet another object of the present invention to quickly reconfigure redundantly arranged elements without lowering transmission efficiency and to maintain high total reliability and service quality, in a network to which the present invention is applied.

The objects stated above are achieved by a packet routing apparatus which is provided with a plurality of control sections redundantly arranged, for performing control over a routing section according to a system configuration which conforms to a standby redundancy method, and allowing the operation of this routing section in a reconfiguration process while delivering information necessary for continuing the control to a section which inherits the control.

In the packet routing apparatus as described above, even when the plurality of control sections function under software which operates by separate OSs incorporating a general-use module therein but not having any assisting function of sharing resources among these control section, the routing section continuously routes packets independently in the reconfiguration process. And at completion of this reconfiguration, the routing can be smoothly reliably inherited under the control of the control section as a new active system.

The objects stated above are also achieved by a packet routing apparatus which is provided with a plurality of control sections redundantly arranged, for performing control over a routing section according to a system configuration which conforms to a standby redundancy method, and delivering information necessary for the inheritance of the control at a predetermined frequency to a standby system defined in this system configuration while allowing the operation of the routing section in a reconfiguration process.

In the packet routing apparatus as described above, even when the plurality of control sections function under software which operates by separate OSs incorporating a general-use module therein but not having any assisting function of sharing resources among these control section, the routing section continuously routes packets independently in the reconfiguration process. And at completion of this reconfiguration, the routing can be smoothly reliably surely handed over under the control of the control section as a new active system.

The objects stated above is also achieved by a packet routing apparatus in which the control sections, when inheriting/handing over the control over the routing section in response to the reconfiguration, establish a new connection to replace the existing connection and generate route selection information suitable for the new connection, and the routing section routes remaining packets based on the route selection information generated by the control sections.

After the completion of the reconfiguration, this packet routing apparatus is able to route the remaining packets via the new connection comprised of resources suited for a system configuration which is determined by the reconfiguration.

The objects stated above are also achieved by a packet routing apparatus in which the control sections, when inheriting/handing over the control of the routing section in accordance with the reconfiguration, establish a connection identical to the pre-established connection as a new connection.

After the completion of the reconfiguration, this packet routing apparatus is able to route the remaining packets via the new connection comprised of resources suited for a system configuration which is determined by the reconfiguration.

The objects stated above are also achieved by a packet routing apparatus in which the control sections judge whether or not the route selection information is consistent with the new connection, and the routing section defers the continuation of the routing when the judgment result is false.

In the packet routing apparatus as described above, the routing section can continuously route the remaining packets via the pre-established connection after the completion of the reconfiguration.

The objects stated above are also achieved by a packet routing apparatus which obtains route selection information consistent with the new connection from an active control section to continue the aforesaid routing based on the obtained route selection information, when the judgment result is false.

In the packet routing apparatus as described above, the aforesaid application system constantly performs predetermined processing on a packet as an object of such routing, or generates this packet or information to be disposed in this packet, irreverent of the reconfiguration result and the triggering factor of the reconfiguration.

The objects stated above are also achieved by a packet routing apparatus which establishes synchronization with a first apparatus for routing each packet as an object of the routing or a second apparatus as a destination of the packet, in a transition process of an active system to a standby system in response to the reconfiguration.

When the control sections do not provide the route selection information consistent with the reconfiguration result even after the completion of the reconfiguration, the above packet routing apparatus is able to avoid the routing of the remaining packets based on improper route selection information.

The objects stated above are also achieved by a packet routing apparatus which establishes the synchronization by transmitting a packet to be a preferential object of the routing according to a predetermined communication protocol, to one or both of the first and second apparatuses via the routing section.

In the packet routing apparatus as described above, the control section operating as the active system obtains or generates proper route selection information at the completion of the reconfiguration, and delivers the information, which is obtainable by the routing section, to the routing section which is to route the remaining packets.

The objects stated above are also achieved by a packet routing apparatus which maintains a relationship among the routing section, an application system cooperating with the routing section, and a connection suitable for the route selection information applied to the routing by the routing section, under the control performed according to the system configuration.

In the packet routing apparatus as described above, each apparatus in the same connection can cooperate with each other stably and reliably based on the aforesaid reconfiguration protocol.

The objects stated above are also achieved by a packet routing apparatus which is provided with a section for monitoring the states of each of the control sections and resources associated with the connection and for performing maintenance and the reconfiguration of the system configuration based on the standby redundancy according to the monitored states.

In the packet routing apparatus as described above, each apparatus in the same connection maintains the synchronization with each other with reliability in the aforesaid reconfiguration process, even when a dedicated communication link is not laid among the apparatuses.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 2 is an operational flow chart of first to fourth embodiments of the present invention;

FIG. 4 is a chart showing a constitution example of a packet;

FIG. 5 is a diagram showing a configuration example of a packet routing apparatus disposed in an MPLS network;

FIG. 6 is a chart showing an example of route selection information; and

DESCRIPTION OF THE PREFERRED EMBODIMENTS

The principle of a packet routing apparatus according to the present invention will be first explained with reference to FIG. 1.

Figure 1:
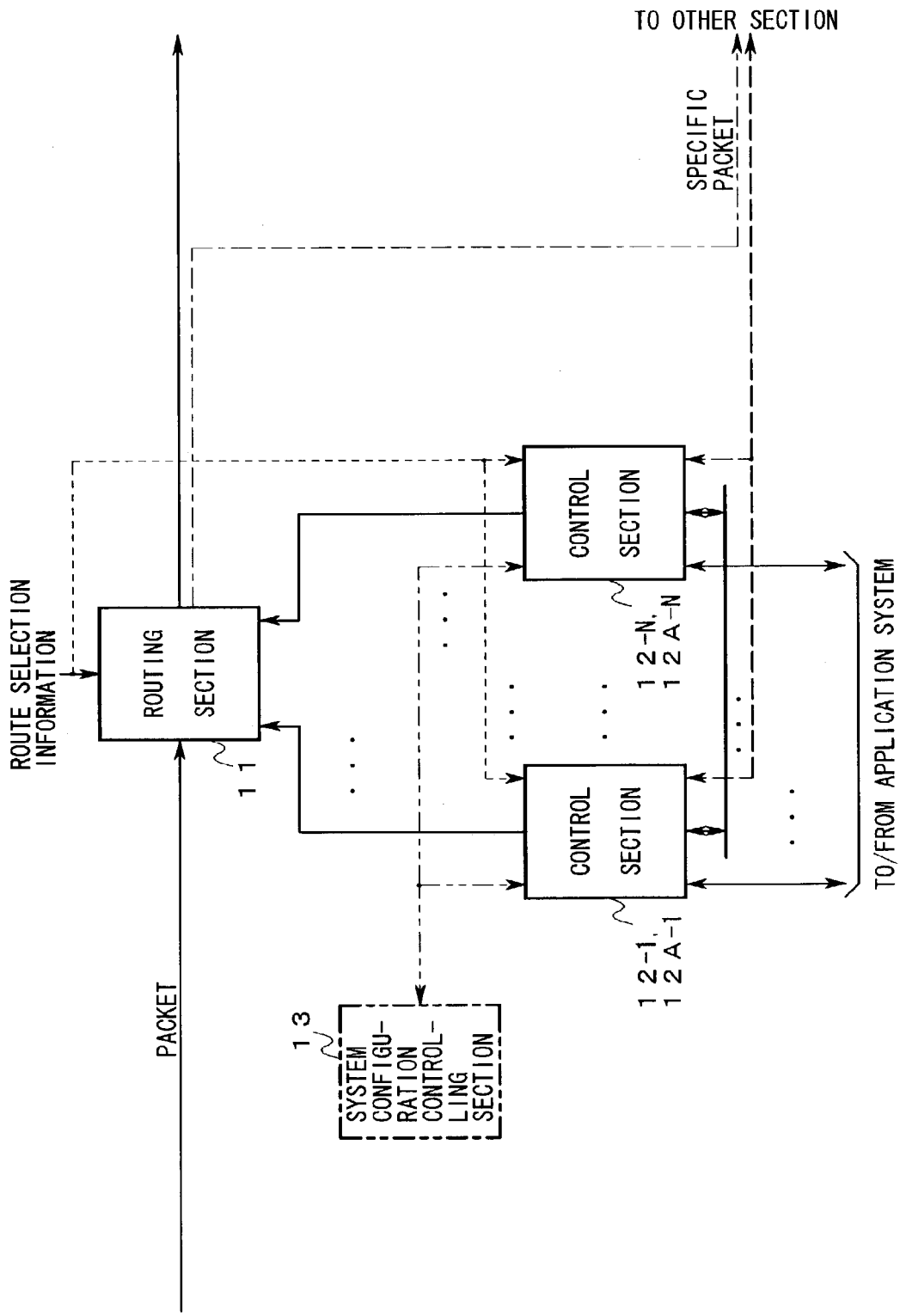
FIG. 1 is a block diagram showing the principle of the present invention.

FIG. 1 is a block diagram showing the principle of the present invention.

A packet routing apparatus shown in FIG. 1 is composed of a routing section 11, control sections 12-1 to 12-N, 12A-1 to 12A-N, and a system configuration controlling section 13.

The principle of a first packet routing apparatus according to the present invention is as follows.

The routing section 11 stores inputted packets and routes these packets based on route selection information conforming to a pre-established connection. The plural control sections 12-1 to 12-N, which are arranged redundantly, control the routing section 11 according to system configuration conforming to standby redundancy, and allows the operation of the routing section 11 in a reconfiguration process while delivering information necessary for the continuation of this control to a part which is to inherit this control.

In other words, even when the plurality of control sections 12-1 to 12-N function under software which operates by separate OSs incorporating a general-use module therein but not having any assisting function of sharing resources among these control section, the routing section 11 continuously routes packets independently in the reconfiguration process. And at completion of this reconfiguration, the routing can be smoothly reliably inherited under the control of the control section as a new active system.

This makes it possible to avoid an increase in transmission delay and degradation in service quality which have occurred in the reconfiguration process of the prior art, without any change in basic hardware configuration.

The principle of a second packet routing apparatus according to the present invention is as follows.

The routing section 11 stores inputted packets and routes these packets based on route selection information conforming to a pre-established connection. The plural control sections 12A-1 to 12A-N, which are arranged redundantly, control the routing section 11 according to system configuration conforming to standby redundancy, and deliver information necessary for the inheritance of this control to a standby system indicated in this system configuration at a predetermined frequency while allowing the operation of the routing section 11 in a reconfiguration process.

In other words, even when the plurality of control sections 12-1 to 12-N function under software which operates by separate OSs incorporating a general-use module therein but not having any assisting function of sharing resources among these control section, the routing section 11 continuously routes packets independently in the reconfiguration process. And at completion of this reconfiguration, the routing can be smoothly reliably inherited under the control of the control section as a new active system.

This makes it possible to avoid an increase in transmission delay and degradation in service quality which have occurred in the reconfiguration process of the prior art, without any change in basic hardware configuration.

The principle of a third packet routing apparatus according to the present invention is as follows.

The plural control sections 12-1 to 12-N, 12A-1 to 12A-N, when inheriting/handing over the control over the routing section 11 in accordance with the reconfiguration, establish a new connection to replace an exiting connection and generate route selection information conforming to the new connection. The routing section 11 routes remaining packets based on thus generated route selection information.

In other words, after the completion of the reconfiguration, the routing section 11 can route the remaining packets via the new connection comprised of resources suited for a system configuration which is determined by the reconfiguration.

Consequently, it is able to achieve a smooth reconfiguration and avoid an increase in transmission delay and degradation in transmission quality in the reconfiguration process, regardless of which type of a protocol a connection oriented path is formed by, as long as a new proper connection is established at the time of the reconfiguration.

The principle of a fourth packet routing apparatus according to the present invention is as follows.

The plural control sections 12-1 to 12-N, 12A-1 to 12A-N, when inheriting/handing over the control over the routing section 11 in accordance with the reconfiguration, establish an identical connection to the pre-established connection as the new connection.

In other words, the routing section 11 can continue to route remaining packets via the pre-established connection after the completion of the reconfiguration.

Accordingly, it is able to achieve a smooth reconfiguration and substantially reduce a transmission delay and degradation in transmission quality in the reconfiguration process, regardless of which type of a protocol a connection oriented path is formed by, as long as such a new connection can be secured.

The principle of a fifth packet routing apparatus according to the present invention is as follows.

Under the control performed according to the system configuration, the plural control sections 12-1 to 12-N, 12A-1 to 12A-N maintain the relationship among the routing section 11, an application system cooperating with the routing section 11, and a connection conforming to the route selection information applied to the routing by the routing section 11.

In other words, the aforesaid application system constantly performs predetermined processing on a packet as an object of such routing, or generates this packet or information to be disposed in this packet, irreverent of the reconfiguration result and the triggering factor of the reconfiguration.

Consequently, the control sections 12-1 to 12-N, 12A-1 to 12A-N and a routing section 11 are able to adapt to a hardware configuration and the configuration of software realizing their processing is simplified.

The principle of a sixth packet routing apparatus according to the present invention is as follows.

The plural control sections 12-1 to 12-N, 12A-1 to 12A-N judge whether or not the route selection information is consistent with the new connection. The routing section 11 defers the continuation of the routing when the result of this judgment is false.

That is, when the control sections 12-1 to 12-N, 12A-1 to 12A-N do not provide the route selection information consistent with the reconfiguration result even after the completion of the reconfiguration, the above packet routing apparatus is able to avoid the routing of the remaining packets based on improper route selection information.

This realizes various forms of functional distribution and load distribution compared with the case in which route selection information is generated only by the control section operating as an active system.

The principle of a seventh packet routing apparatus according to the present invention is as follows.

The routing section 11, when the result of the judgment is false, obtains the route selection information consistent with the new connection from the control section, operating as the active system, among the plural control sections 12-1 to 12-N, 12A-1 to 12A-N and continues the routing based on the obtained route selection information.

That is, the control section operating as the active system obtains or generates proper route selection information at the completion of the reconfiguration, and delivers the information, which is obtainable by the routing section 11, to the routing section 11 which is to route the remaining packets.

Consequently, it is possible to surely reduce an increase in transmission delay and degradation in service quality occurring at the time of the reconfiguration even when the degree of congestion is substantially different between the routing section 11 and the control sections 12-1 to 12-N, 12A-1 to 12A-N and these sections operate asynchronously with each other.

The principle of an eighth packet routing apparatus according to the present invention is as follows.

The plural control sections 12-1 to 12-N, 12A-1 to 12A-N establish synchronization with a first apparatus for routing a packet to be an object of the routing or with a second apparatus being a destination of the packet in a transition process from an active system to a standby system in accordance with the reconfiguration.

In other words, individual apparatuses belonging to the same connection can cooperate with each other stably and reliably based on the aforesaid reconfiguration procedure.

This realizes a quick, efficient reconfiguration.

The principle of a ninth packet routing apparatus according to the present invention is as follows.

The plural control sections 12-1 to 12-N, 12A-1 to 12A-N transmit a specific packet, which is preferential object of the routing based on a predetermined communication protocol, to another apparatus via the routing section 11, thereby establishing the synchronization.

In other words, the individual apparatuses belonging to the same connection maintains the synchronization with one another with reliability in the aforesaid reconfiguration process even when a dedicated communication link is not laid among these apparatuses.

This results in a simple, smooth reconfiguration without any increase in cost.

The principle of a tenth packet routing apparatus according to the present invention is as follows.

The system configuration controlling section 13 monitors the states of the plural control sections 12-1 to 12-N, 12A-1 to 12A-N and of resources associated with the connection to maintain and reconfigure the system configuration based on the standby redundancy according to the monitored states.

In other words, the triggering factor of the reconfiguration and the system configuration are determined according to the actual states of the resources associated with the system configuration.

This makes it possible to route packets via a desired connection accurately and stably compared with the case when factors which determine the system configuration and the triggering factor of the reconfiguration include factors other than the aforesaid actual states of the associated resources.

Embodiments of the present invention will be explained in detail below with reference to the drawings.

FIG. 2 is an operational flow chart of first to fourth embodiments of the present invention.

Figure 3:
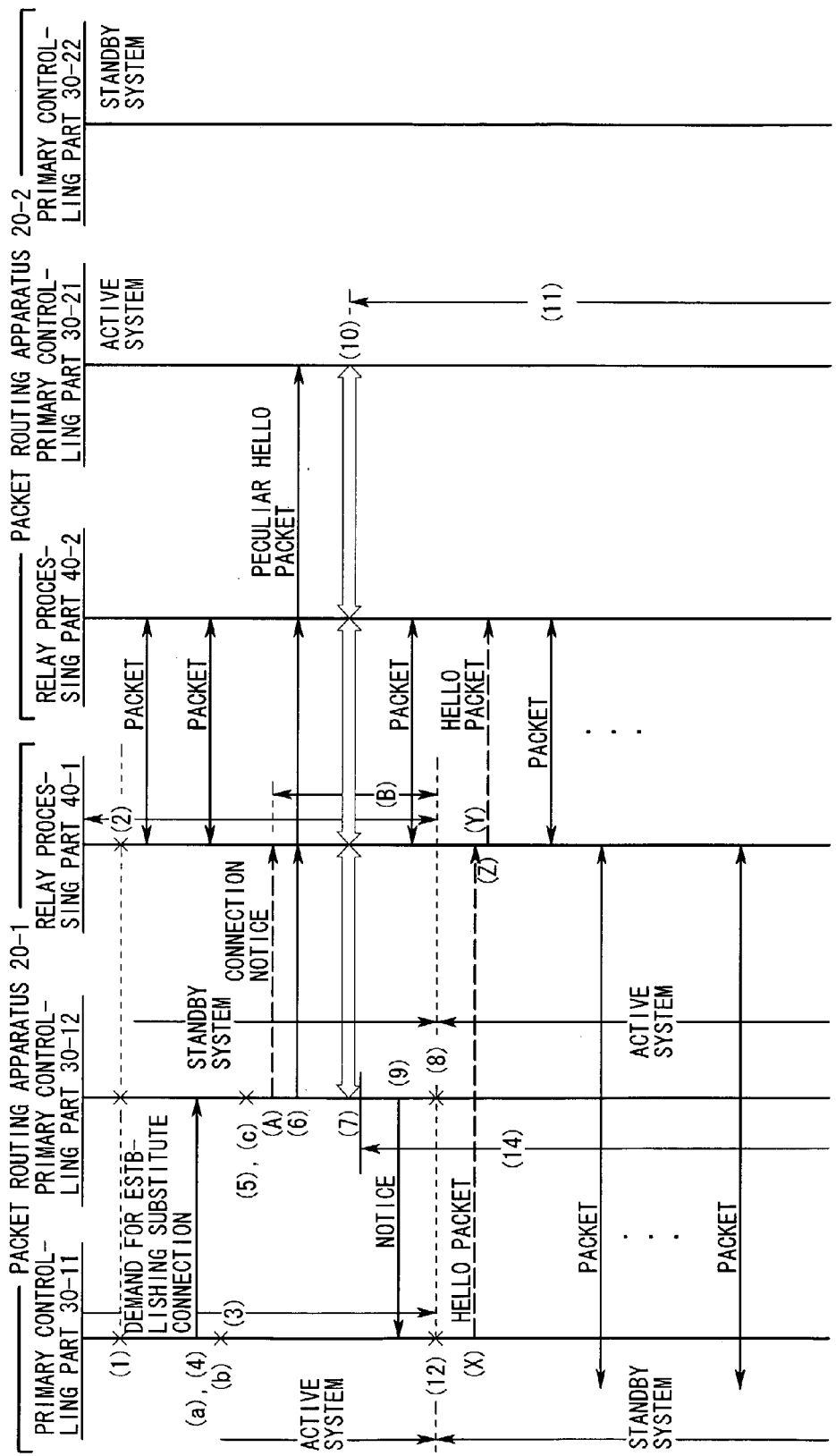
FIG. 3 is a diagram explaining the operation of the first to fourth embodiments of the present invention.
Figure 7:
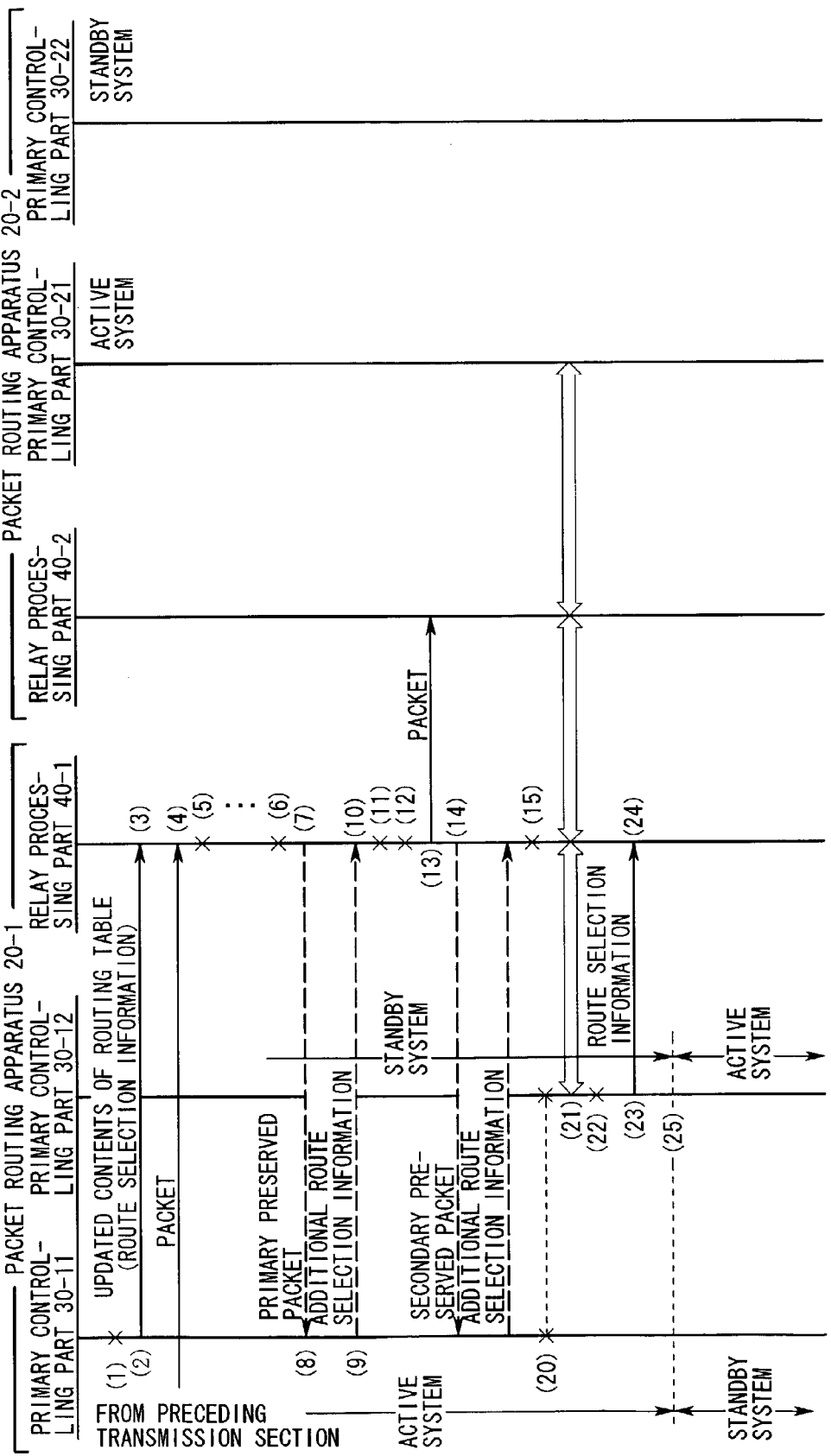
FIG. 7 is a diagram explaining the operation of a conventional example.

FIG. 3 is a diagram explaining the operation of the first to fourth embodiments of the present invention.

The first embodiment of the present invention will be explained below.

The characteristic of this embodiment lies in the following processing procedure for enabling a primary controlling part 30-12 corresponding to a standby system to start operating as an active system in place of a primary controlling part 30-11 when system configuration is updated.

The operation of the first embodiment of the present invention will be explained below with reference to FIG. 2, FIG. 3, and FIG. 5.

An application system as configured below is provided in main processors 31-11, 31-12, 31-21, 31-22 provided in the primary controlling parts 30-11, 30-12, 30-21, 30-22, and network processors 43-1P, 43-1S and I/O processors 46-1P, 46-1S provided in relay processing parts 40-1, 40-2.

It operates under an operating system which does not have any function of supporting the sharing of any resources arranged redundantly.

It is constituted as a group of event driven type processes (tasks) in which prescribed processing is appropriately performed according to an occurring event (including a message or the like notified by another processor).

In addition to information applied to the interface with a standard module such as the aforesaid socket interface and others, the aforesaid route identifier, and the contents of buffer memories 45-1P, 45-1S, 'specific information' consisting of the following information (1) to (3) is not concealed inside the aforesaid operating system and generated, referred to, and updated by the aforesaid application system, the 'specific information' being required to be delivered from an active system to a standby system (a system to be a new active system) at the time of reconfiguration.

(1) MPLS Information Corresponding to each Route (Label), which Consists of the Following Items:
a label value and an IP address/a mask length
an IP address of a subsequent hop
an output interface
an identifier indicating a protocol to be applied to label switching (assumed to be 'LDP' here for simplicity)

(2) Adjacent Session Information Corresponding to each Session Established between Packet Routing Apparatuses adjacent to each other, which Consists of the Following Items:
an LDP identifier allocated to a local apparatus
the state of a relevant LDP session (hereinafter, simply referred to as an 'LDP session')
a label advertisement mode
the number of times an LDP message is transmitted/received in the LDP session
time elapsing from the instant when the LDP session is established
an information indicating title which is identified concerning an adjacent packet routing apparatus in a process in which the LDP session is established and which is disposed in a predetermined field of a received hello packet, the name of an interfacing part involved, an IP address assigned to a transmitting end of the hello packet in question, and an interval value of a timer determined based on a predetermined negotiation (including a keep alive standby value and a keep alive transmission value)
the maximum value for each protocol data, determined in a process of this negotiation
discrete value of a timer which gives the instant when the aforesaid hello packet is to be transmitted
a group of IP addresses assigned to a label switching router which has a past experience of receiving after the instant when the LDP session is established (3) Adjacent Detection Information, which is to be Disposed in a Predetermined Field of the Aforesaid Hello Packet, Consisting of the Following Items:
an identifier of an interfacing part involved in label distribution
an identifier of a label path through which the hello packet is received
an IP address assigned to a transmitting end of the hello packet
an IP address in a transport layer realizing the receipt of the hello packet Incidentally, the explanation on detailed configuration and operation of the aforesaid application system will be omitted here.

Even in the case when some event occurs due to which the continuation of the operation of the primary controlling part 30-11 as the active system is not allowed or is to be interrupted during the period when the primary controlling part 30-11 operates as the active system (FIG. 3 (1)), each of the parts of the relay processing part 40-1 continues to route individual packets remaining in the buffer memories 45-1P, 45-1S based on the route selection information which has been already obtained (FIG. 3 (2)).

In the primary controlling part 30-11, the main processor 31-11, when the aforesaid event occurs, cooperates with the relay processing part 40-1 (for example, providing additional route information according to a primary preserved packet and a secondary preserved packet) to an allowable extent which is determined by a place where the event occurred or the cause of the event (FIG. 3 (3)).

Further, the main processor 31-11 delivers to the main processor 31-12 via branch interfacing parts 36-11, 36-12 the following information, among the existing specific information, necessary for establishing a substitute connection (session) for an existing connection (hereinafter, referred to as 'delivery information), thereby demanding the establishment of the substitute connection (session) (FIG. 2 (1), FIG. 3 (4)).

the information applied to the interface with the standard module (including key information to be used for searching labels stored in storage areas of CAMs 44-1P, 44-1S)
the route identifiers
the MPLS information
the adjacent session information
the adjacent detection information Incidentally, the explanation on the detailed operation and processing procedure of the delivery of such delivery information between the main processors 31-11, 31-12 will be omitted here.

Further, the main processor 31-12, when identifying the aforesaid delivery information, refers to the delivery information to process the following.

to specify the adjacent packet routing apparatus (assumed to be a packet routing apparatus 20-2 here) with which an individual connection (session) is pre-established under the control of the primary controlling part 30-11 operating as the active system (FIG. 2 (2), FIG. 3 (5))
to transmit to this packet routing apparatus the peculiar hello packet in which the aforesaid 'adjacent detection information' is disposed in the predetermined field (the basic structure of such a hello packet and the operation of the parts cooperating with one another at the time of transmitting the hello packet are the same as those in the later described fourth embodiment, and therefore, the explanation thereof will be omitted here.) (FIG. 2 (3), FIG. 3 (6))
to establish a TCP session appropriate for the MPLS (LDP) (FIG. 2 (4), FIG. 3 (7))
to start its operation as a new active system by applying the 'identifier of the label path through which the hello packet' is received, the hello packet being included in the aforesaid 'adjacent detection information' and the 'delivery information', at the time of completion of establishing the TCP session (FIG. 2 (S), FIG. 3 (8))
to transmit an advance notice of the start of the operation to the main processor 31-11 via the branch interfacing parts 36-12, 36-11 (FIG. 2 (6), FIG. 3 (9))
to cooperate with the relay processing part 40-1 in place of the primary controlling part 30-11 (the main processor 31-11) to route the individual packets remaining in the buffer memories 45-1P, 45-1S (FIG. 3 (14))

Meanwhile, in the packet routing apparatus 20-2, when the aforesaid peculiar hello packet is received, the following processing is performed.

to initialize the discrete value of the timer for counting the keep alive standby time
to duly perform processing necessary for establishing the aforesaid TCP session (FIG. 3 (1 0))
in the case when such establishment of the TCP session is completed during a period shorter than the aforesaid initialized interval value of the timer, to apply the 'delivery information' which is precedingly delivered (assumed here for simplicity to be delivered from the packet routing apparatus 20-1 prior to the reconfiguration of the packet routing apparatus 20-1 based on a prescribed communication protocol) together with the 'identifier of the label path through which the hello packet' is received, thereby starting its operation in association with the primary controlling part 30-12 which becomes the active system in accordance with the aforesaid reconfiguration in the packet routing apparatus 20-1, the hello packet being included in the 'adjacent detection information' which is extracted from the aforesaid peculiar hello packet (FIG. 3 (11 ))

In short, though the primary controlling parts 30-11, 30-12 operate based on the standby redundancy, the software provided in the main processors 31-11, 31-12 in these primary controlling parts 30-11, 30-12 operate under the operating systems which conform to such standby redundancy and has no supporting function of the resource sharing, and the relay processing part 40-1 continues to route the remaining packets in sequence even during the period when an effort is being made to establish the substitute connection (session) at the time of the reconfiguration based on the standby redundancy (FIG. 3 (2)).

Further, during the period in which the effort is being made to establish the aforesaid substitute connection (session), an application system corresponding to, for example, an upper layer of a TCP layer identifies the continued maintenance of the pre-established connection, thereby capable of continuing its own processing without suspension.

Thus, according to this embodiment, the software to which a general-use module is flexibly applied is provided in the main processors 31-11, 31-12, the network processors 43-1P, 43-1S, and the I/O processors 46-1P, 46-1S without a peculiar operating system, which is optimized for a desired redundant configuration, being applied thereto, and degradation in transmission speed and transmission quality caused in a conventional example in the reconfiguration process is avoided with high reliability without any basic change in hardware configuration.

Incidentally, in this embodiment, the specific information is delivered to the primary controlling part as the standby system which is to become the active system at the instant when this primary controlling part identifies the establishment of the substitute connection (session).

However, the present invention is not limited to the configuration as described above, and for example, any of the following configurations may be applied.

The specific information is delivered from the primary controlling part as the active system to the primary controlling part as the standby system and the relay processing part belonging thereto at a predetermined frequency during the period when no event requiring the reconfiguration occurs, and only updated information in the specific information precedingly delivered is delivered in the reconfiguration process, thereby realizing load reduction and high speed processing in the updating of the system configuration.
During the period in which no event requiring the change in the system configuration occurs, the specific information is delivered from the primary controlling part as the active system to the primary controlling part as the standby system and the relay processing part belonging thereto at a high frequency within the tolerable limit of increase in throughput of each part and in the degree of overload, thereby eliminating the delivery of the specific information in the process of updating the system configuration.

Further, in this embodiment, all the packets are routed via the pre-established connection (session) in all the transmission sections up to the destination.

However, the present invention is not limited to the configuration as described above, and for example, when a packet in question is transmitted based on a connectionless communication protocol in a part of these transmission sections, it may be omittable to establish the substitute connection (session) in accordance with the reconfiguration.

Further, this embodiment shows no specific techniques relating to the transmission of the information to be delivered in the reconfiguration process of the duplex primary controlling parts 30-11, 30-12, which is necessary information for these primary controlling parts 30-11, 30-12 to enable cooperation of the packet routing apparatus 20-1 with the other packet routing apparatus 20-2.

Such information, however, is not inherent to the present invention, and it may be disposed in a spare field of the packet and transmitted or may be transmitted via any path or link as shown by the half-tone dot meshing in FIG. 4, for example.

The operation of the second embodiment of the present invention will be explained below with reference to FIG. 2, FIG. 3, and FIG. 5.

The characteristic of this embodiment lies in the following processing procedure performed by the main processors 31-11, 31-12 provided in the primary controlling parts 30-11, 30-12 respectively.

The main processor 31-11 provided in the primary controlling part 30-11, when the aforesaid event occurs, cooperates with the relay processing part 40-1 to an allowable extent which is determined by a place where the event occurred or the cause of the event (FIG. 3 (3)) similarly to the above-described first embodiment, and at the same time, transmits the 'connection (session) establishment demand' including information necessary for the reestablishment of the existing connection (session), to the main processor 31-12 via the branch interfacing parts 36-11, 36-12, (FIG. 2 (1), FIG. 3 (*a*)).

Further, the main processor 31-11 cooperates with the relay processing part 40-1 to eliminate the aforesaid existing connection (session) (FIG. 2 (9), FIG. 3 (*b*)).

Meanwhile, the main processor 31-12 provided in the primary controlling part 30-12, when identifying the aforesaid demand, tries, over a prescribed period, to establish the aforesaid 'existing connection (session)' which is indicated by the information included in this demand, and it reestablishes this connection (session) as soon as the main processor 31-11 eliminates the connection (session) as described above (FIG. 2 (10), FIG. 3 (*c*)).

Incidentally, the operation of each part after this connection (session) is established is the same as the operation in the first embodiment described above, and therefore, the explanation thereof will be omitted here.

Thus, according to this embodiment, the same connection (session) as the existing connection (session) which is established by 'the primary controlling part 30-11 precedingly operating as the active system' is surely established by the primary controlling part 30-12 which is to shift from the standby system to the active system, and the routing of the remaining packets are continued via this connection (session).

This prevents occurrence of a delay caused by securing resources constituting the substitute connection (session), and surely and quickly achieves the reconfiguration of the duplex primary controlling parts regardless of forms of traffic distribution.

The operation of the third embodiment of the present invention will be explained below with reference to FIG. 2, FIG. 3, and FIG. 5.

The characteristic of this embodiment lies in the following processing procedure performed by the main processors 31-11, 31-12 provided in the primary controlling parts 30-11, 30-12 respectively.

The main processor 31-11 provided in the primary controlling part 30-11, when the aforesaid event occurs, cooperates with the relay processing part 40-1 to an allowable extent which is determined by a place where the event occurred or the cause of the event (FIG. 3 (3)), and at the same time, gives a demand that the substitute connection (session) for the existing connection (session) should be established to the main processor 31-12 via the branch interfacing parts 36-11, 36-12 (FIG. 2 (1), FIG. 3 (4)).

Meanwhile, the main processor 31-12 provided in the primary controlling part 30-12, when establishing the aforesaid connection (session) (FIG. 3 (5), (*b*)) in response to the demand given by the primary controlling part 30-11 (FIG. 3 (4), (*a*)), transmits a 'connection notice' indicating this connection (session) to the network processors 43-1P, 43-1S (FIG. 2 (12), FIG. 3 (A)).

The network processor 43-1P (43-1S) processes the following in response to such a 'connection notice'.

to store valid route selection information in the CAM 43-1P (43-1S) and judge whether or not this valid route selection information is consistent with the connection (session) indicated by the 'connection notice' mentioned above (hereinafter, referred to as 'route information judgment')
  to perform the same processing as that in the first and second embodiments described above when the result of this route information judgment is false
  when, on the other hand, the result of the route information judgment is true, to continue to route the remaining packets in sequence (FIG. 3 (B)), without waiting for the 'information necessary for updating the system configuration' given by the main processor 30-11 in the aforesaid manner (FIG. 3 (10))

In short, the relay processing part 40-1 starts to route the remaining packets based on the route selection information without delay when the route selection information stored in the CAM 44-1P continues to be applicable even after the aforesaid reconfiguration.

Thus, according to this embodiment, a valid label path is formed without delay in the connection (session) established by the primary controlling part 30-12 operating as a new active system, compared with the first and second embodiments described above.

Consequently, the updating speed of the system configuration is increased on average, and service quality and transmission quality are enhanced compared with the first and second embodiments describe above.

Incidentally, in this embodiment, the main processor 31-11 transmits the 'information necessary for updating the system configuration' to the relay processing part 40-1 in response to the aforesaid notice, similarly to the first and second embodiments (FIG. 3 (10)).

However, the present invention is not limited to the configuration as described above, and for example, either one of the following configurations may be applied to reduce throughput and load relating to the system configuration update.

When the result of the route information judgment is delivered by the relay processing part 40-1 and it is true, the main processor 31-11 omits the aforesaid transmission of the 'information necessary for updating the system configuration' to the relay processing part 40-1.

When the result of the route information judgment is false, the relay processing part 40-1 (either the network processors 43-1P, 43-1S or the I/O processors 46-1P, 46-1S) transmits "a notice indicating the triggering factor (cause) requiring the transmission of the 'information necessary for updating the system configuration' in place of the aforesaid 'notice'" to the primary controlling part 30-11 (the main processor 31-11).

The fourth embodiment of the present invention will be explained below.

The operation of the fourth embodiment of the present invention will be explained below with reference to FIG. 2, FIG. 3, and FIG. 5.

The characteristic of this embodiment lies in the following processing procedure performed by the I/O processors 46-1P, 46-1S.

The main processor 31-11 as the active system generates a hello packet in a prescribed form when necessary in order to establish synchronization with another packet routing apparatus (the packet routing apparatus 20-2 or the like), and delivers the hello packet to a submodule 41-1S via the branch interfacing part 36-11 (FIG. 2 (13), FIG. 3 (X)). Incidentally, such a hello packet is assumed here for simplicity to include as a Configuration Sequence Number a peculiar number (='0xffffffff' as a hexadecimal) not used for normal communication control and maintenance.

In the submodule 41-1S, such a hello packet is temporarily stored in the buffer memory 45-1S (FIG. 3 (Y)).

The I/O processor 46-1S transmits (preferentially) the hello packet stored in the buffer memory 45-1S to the packet routing apparatus 20-2 based on the predetermined communication protocol (FIG. 3 (Z)).

In short, the plural packet routing apparatuses involved in a common connection (session) appropriately transmit and identify the aforesaid hello packet and so on transmitted via an existing path laid between these packet routing apparatuses, thereby achieving the aforesaid reconfiguration in synchronization with each other with high reliability.

Incidentally, the above-described embodiments have not specified what causes or triggers the updating of the system configuration of the duplex primary controlling parts which is externally designated.

However, since the cause and the triggering factor mentioned above are not the characteristics of the present invention, and can be obtained with high reliability by applying various known techniques conforming to a desired redundant configuration, the explanation thereof will be omitted here.

Further, all or part of a section for identifying such a cause to give the form and the triggering factor of the reconfiguration may be realized under any load distribution and functional distribution among the primary controlling parts 30-11, 30-12 and the relay processing part 40-1, as long as the section is adaptable to a network configuration to which the present invention is applied and to the configuration of the packet routing apparatus, and an appropriate reconfiguration is carried out according to a prescribed event.

Further, in the embodiments described above, the present invention is applied to the MPLS network in which the connection oriented label path is formed.

However, the application of the present invention is not limited to the MPLS network using such an LDP (Label Distribution Protocol), and is also applicable to a network to which any communication protocol such as a BGP (Border Gateway Protocol) and others is applied, as long as the connection oriented path is formed under store and forward switching.

Further, in the embodiments described above, the relay processing part 40-1 is not configured redundantly at all.

However, the present invention is not limited to the configuration as described above, and for example, the relay processing parts 40-1 may be duplexed similarly to the primary controlling parts 30-11, 30-12 or may be configured redundantly by a desired method.

Further, in the embodiments described above, the system configuration of the primary controlling parts 30-11, 30-12 is set and updated based on the standby redundancy.

However, the present invention is not limited to the configuration as described above, and the primary controlling parts may be configured redundantly in any form as long as the active system and the standby system can be surely specified based on the system configuration.

Further, in the embodiments described above, the connection and the session are comprehensively established and released.

However, when such a session signifies, for example, a 'logical connection between the established connection and a prescribed application system (constituted as processes or tasks)', the session may be defined as 'correspondence' between the 'application system executed by the new active system after the completion of the reconfiguration' and the 'new connection established in the reconfiguration process', and may be updated when necessary.

Further, in the embodiments described above, the information to be referred to or delivered among the primary controlling part as the active system and the primary controlling part as the standby system and the relay processing part is not specifically disclosed in detail.

However, such information may include any items such as the following items and others as long as it is consistent with the communication protocol forming a desired connection oriented path and with the application system such as the aforesaid process and others, and any form and combination are permissible.

a 'label' indicating the label path
    'location information' indicating a field on the packet on which the path indicated by the 'label' is to be disposed
    a MAC address
    an IP address Further, in the embodiments described above, the triggering factor of the reconfiguration is externally given automatically according to an event such as an uncritical trouble or the like which has occurred in the primary controlling part as the active system.

However, the present invention is not limited to the configuration as described above, and for example, a section for initiatively determining such a triggering factor and a policy of the reconfiguration may be provided in any of the following forms.

a section integrated with the primary controlling part
    a section provided separately from the primary controlling part
    a section in which functional distribution and load distribution are realized by the primary controlling part Further, the present invention is not limited to the above embodiments and various modifications may be made without departing from the spirit and scope of the invention. Any improvement may be made in part or al of the components.

The invention is not limited to the above embodiments and various modifications may be made without departing from the spirit and scope of the invention. Any improvement may be made in part or all of the components.

What is claimed is:

1. A packet routing apparatus, comprising:
a routing section for storing inputted packets and routing the stored packets according to route selection information suitable for a pre-established connection; and
a plurality of control sections being redundantly arranged, for controlling said routing section according to a system configuration which complies with a standby redundancy method, and for allowing operation of said routing section in a process of reconfiguration and delivering information to a section which inherits the control, the information being necessary information for continuance of the control wherein,
when inheriting/handing over the control of said routing section in response to said reconfiguration, said plurality of control sections establish a new connection replacing an existing connection and generate route selection information suitable for the new connection, said routing section routes remaining packets according to the route selection information generated by said plurality of control sections, said plurality of control sections judge whether or not said route selection information is suitable for said new connection; and said routing section defers continuation of said routing when a result of the judgment is false.

2. The packet routing apparatus according to claim 1, wherein when inheriting/handing over the control of said routing section in response to said reconfiguration, said plurality of control sections establish a connection identical to said pre-established connection as a now connection.

3. The packet routing apparatus according to claim 1, wherein when a result of said judgment is false, said routing section obtains route selection information suitable for said new connection from one of said plurality of control sections to continue said routing according to the obtained route selection information, the one control section being an active system.

4. The packet routing apparatus according to claim 1, wherein under control performed according to said system configuration, said plurality of control sections maintain a relationship among said routing section, an application system cooperating with said routing section, and a connection suitable for route selection information applied to said routing by the routing section.

5. The packet routing apparatus according to claim 1, further comprising a system configuration controlling section for monitoring states of said plurality of control sections and of a resource, and for performing maintenance and said reconfiguration of the system configuration in accordance with the monitored states, the resource relating to said connection, the maintenance and said reconfiguration being performed in compliance with said standby redundancy method.

6. A packet routing apparatus, comprising:
a routing section for storing inputted packets and routing the stored packets according to route selection information suitable for a pre-established connection; and
a plurality of control sections being redundantly arranged, for controlling said routing section according to a system configuration which complies with a standby redundancy method, and delivering information to a standby system at a predetermined frequency, and for allowing operation of said routing section in a process of reconfiguration, the information being necessary information for inheritance of the control, the standby system being a system defined in the system configuration control wherein,
when inheriting/handing over the control of said routing section in response to said reconfiguration, said plurality of control sections establish a new connection replacing an existing connection and generate route selection information suitable for the new connection, said routing section routes remaining packets according to the route selection information generated by said plurality of control sections, said plurality of control sections judge whether or not said route selection information is suitable for said new connection; and said routing section defers continuation of said routing when a result of the judgment is false.

7. The packet routing apparatus according to claim 6, wherein when inheriting/handing over the control of said routing section in response to said reconfiguration, said plurality of control sections establish a connection identical to said pre-established connection as a new connection.

8. The packet routing apparatus according to claim 6, wherein when a result of said judgment is false, said routing section obtains route selection information suitable for said new connection from one of said plurality of control sections to continue said routing according to the obtained route selection information, the one control section being an active system.

9. The packet routing apparatus according to claim 6, wherein under control performed according to said system configuration, said plurality of control sections maintain a relationship among said routing section, an application system cooperating with said routing section, and a connection suitable for route selection information applied to said routing by the routing section.

10. The packet routing apparatus according to claim 6, further comprising a system configuration controlling section for monitoring states of said plurality of control sections and of a resource, and for performing maintenance and said reconfiguration of the system configuration in accordance with the monitored states, the resource relating to said connection, the maintenance and said reconfiguration being performed in compliance with said standby redundancy method.

11. A racket routing apparatus, comprising:
a routine section for storing inputted packets and routing the stored packets according to route selection information suitable for a pre-established connection; and
a plurality of control sections being redundantly arranged, for controlling said routing section according to a system configuration which complies with a standby redundancy method, and for allowing operation of said routing section in a process of reconfiguration and delivering information to a section which inherits the control, the information being necessary information for continuance of the control wherein
said plurality of control sections establish synchronization with one of a first apparatus for routing a racket to be an object of said routing and a second apparatus being a destination of the packet, in a transition process from an active system to a standby system in response to said reconfiguration the first and second apparatuses being apparatuses excluding said packet routing apparatus and said plurality of control sections establish the synchronization by transmitting a specific packet to one or both of said first and second apparatuses via said routing section, the specific packet being a preferential object of said routing according to a predetermined communication protocol.

12. A packet routing apparatus, comprising:

a routing section for storing inputted packets and routine the stored packets according to route selection information suitable for a pit-established connection; and a plurality of control sections being redundantly arranged, for controlling said routing section according to a system configuration which complies with a standby redundancy method, and delivering information to a standby system at a predetermined frequency, and for allowing operation of said routine section in a process of reconfiguration, the information being necessary information for inheritance of the control, the standby system being a system defined in the system configuration control, wherein said plurality of control sections establish synchronization with one of a first apparatus for routing a packet to be an object of said routing and a second apparatus being a destination of the packet, in a transition process from an active system to a standby system in response to said reconfiguration, the first and second apparatuses being apparatuses excluding said packet routing apparatus and said plurality of control sections establish the synchronization by transmitting a specific packet to one or both of said first and second apparatuses via said routing section, the specific packet being a preferential object of said routing according to a predetermined communication protocol.

* * * * *